(12) United States Patent
Wilding

(10) Patent No.: US 6,464,277 B2
(45) Date of Patent: Oct. 15, 2002

(54) MOVEABLE TRUCK TOOLBOX AND TRUCK TOOLBOX MOVING SYSTEM

(76) Inventor: Brian Allen Wilding, 42 Edenborough Drive, Brampton Ontario (CA), L6T 3A4

(*) Notice: Subject to any disclaimer, the term of this patent is extended or adjusted under 35 U.S.C. 154(b) by 0 days.

(21) Appl. No.: 09/824,755

(22) Filed: Apr. 4, 2001

(65) Prior Publication Data

US 2002/0057001 A1 May 16, 2002

Related U.S. Application Data

(60) Provisional application No. 60/194,399, filed on Apr. 4, 2000.

(51) Int. Cl.[7] ................................................. B60N 3/12
(52) U.S. Cl. ...................................... 296/37.6; 224/404
(58) Field of Search ................................ 296/37.6, 0.1, 296/0.7, 0.13, 0.17, 3; 224/404, 281, 541, 403

(56) References Cited

U.S. PATENT DOCUMENTS

| | | | | |
|---|---|---|---|---|
| 4,249,684 A | | 2/1981 | Miller et al. | |
| 4,522,326 A | * | 6/1985 | Tuohy, III | 296/37.6 |
| 4,635,992 A | * | 1/1987 | Hamilton et al. | 296/37.6 |
| 4,998,425 A | * | 3/1991 | Hoogland | 396/37.6 |
| 5,052,739 A | * | 10/1991 | Irwin | 296/37.6 |
| 5,088,636 A | * | 2/1992 | Barajas | 296/37.6 |
| 5,121,959 A | * | 6/1992 | King | 296/37.6 |
| 5,897,154 A | * | 4/1999 | Albertini et al. | 296/37.6 |
| 5,934,725 A | * | 8/1999 | Bowers | 296/37.6 |
| 6,006,971 A | * | 12/1999 | Coleman et al. | 296/37.6 |
| 6,068,319 A | * | 5/2000 | O'Brien | 296/37.6 |
| 6,116,673 A | * | 9/2000 | Clonan | 296/37.6 |
| 6,253,976 B1 | * | 7/2001 | Coleman et al. | 296/37.6 |
| 6,264,083 B1 | * | 7/2001 | Pavlick et al. | 296/37.6 |
| 6,283,526 B1 | * | 9/2001 | Keough et al. | 296/37.6 |
| 6,318,780 B1 | * | 11/2001 | St. Aubin | 296/37.6 |
| 2001/0050299 A1 | * | 12/2001 | Colemena et al. | 224/404 |
| 2002/0014505 A1 | * | 2/2002 | Lance et al. | 296/37.6 |

* cited by examiner

Primary Examiner—Kiran Patel
(74) Attorney, Agent, or Firm—Eugene J. A. Gierczak

(57) ABSTRACT

A securing system is provided for securing a container adjacent to the top of the side walls of the rear compartment of a truck. The securing system includes a rail mounted on the side walls of the rear compartment, the rail having a profile which corresponds with the profile of wheels mounted on the container. The securing system reciprocates between a first position in which the container is secured to the rear compartment, and a second position in which the container is moveable along the length of the rail. A container adapted to be secured to the side walls of the rear compartment of a truck is also provided. Further, a method of retrofitting a container for use in the rear compartment of a truck with the securing system is also provided.

6 Claims, 8 Drawing Sheets

US 6,464,277 B2

MOVEABLE TRUCK TOOLBOX AND TRUCK TOOLBOX MOVING SYSTEM

Applicant claims priority based on application Ser. No. 60/194,399 filed Apr. 4, 2000.

FIELD OF THE INVENTION

This invention relates in general to a moveable truck toolbox that is moveable along the length of the rear compartment on the top of the side walls of a pickup truck box. This invention also relates to a truck toolbox moving system for moving other types of storage containers along the length of the top of the rear compartment side walls of a pickup truck box.

BACKGROUND OF THE INVENTION

Containers such as toolboxes adaptable to be stored in the rear compartment of pickup trucks are well-known. For the most part, these toolboxes are adaptable for use in the bed of a pickup truck. These prior art pickup toolboxes are generally secured to the floor or the lower portions of the side walls of the bed of the pickup truck.

Some prior art pickup toolboxes are known wherein the toolbox is removable from the pickup truck bed. For example, U.S. Pat. No. 4,249,684, issued to Miller et al., discloses a system for providing a removable toolbox. In particular, this patent provides for a system for securing a box to a chassis comprising: a box having a lockable cover, side walls, and a bottom which is raised at least in part; at least two spaced parallel anchor rails affixed to said chassis to which said box may be locked, each of said anchor rails having at least one slot and a configuration which can be accommodated beneath said raised bottom portion of said box, thereby making the anchor rails inaccessible when the box is secured to the chassis; means for securing said anchor rails to said chassis; a pair of brackets, each secured to an interior side wall of said box; at least one locking rod associated with each of said brackets and vertically supported by said brackets, said rods having top and bottom angled portions, said top angled portion overlapping said bracket such that in the locked position only the tip of the angled portion contacts said bracket, said bottom angled portion capable of being inserted into said slot in said anchor rail and rotated underneath said anchor rail such that in the locked position only the tip contacts the anchor rail; a plurality of resilient mounts positioned between the bottom of said box and each of said anchor rails, whereby said resilient mounts assist in maintaining anchoring pressure between said box and said anchor rails and cushion said box against shocks when said box and chassis are transported.

There are numerous disadvantages to the prior art pickup toolboxes. First, such prior art toolboxes are generally not moveable. This is disadvantageous because users of such pickup toolboxes often need to remove the toolboxes from the pickup truck to a work site for easy access to the tools contained therein during work, or move the toolbox closer to the door of hatch of the rear compartment. Further, even in the case of prior art pickup toolboxes that are moveable, the mechanism provided for moving same is complicated, expensive to manufacture, and does not adequately address dirt and ice buildup, is difficult to use and takes up a significant amount of space in the pickup bed. In fact, the most significant disadvantage of said prior art pickup toolboxes, whether fixed to the floor of the pickup bed or moveable along the plane of said floor, is that the pickup toolbox resting on the bed and being relatively large takes up a permanent and significant part of the space in the rear compartment. This is a notable disadvantage as the rear compartment is generally used to transport cargo or other stored items, in addition to the pickup toolbox.

Therefore, there is a need for pickup container such as a toolbox that is moveable and leaves the pickup bed floor substantially free to hold cargo and/or other items. There is also need for a pickup container moving system adaptable to be connected to prior art pickup containers such as toolboxes or other containers suitable for holding bulky articles, the pickup container moving system permitting such containers to be moved within the rear compartment of a pickup or off of said pickup entirely.

SUMMARY OF THE INVENTION

In one aspect of the present invention there is provided a container for use in the rear compartment of a truck, said rear compartment having a pair of spaced apart side walls, said container comprising: a moving means adapted to register with a support means, said support means including a rail portion or protrusion being mounted adjacent to the top of said pair of side walls, said support means having a length, said moving means being adapted to register with said nail portion or protrusion and permit movement of said container along said length; and a securing means provided in combination with said support means for securing said container to said support means, said securing means being adapted to reciprocate between, a first position wherein said containers secured, to a second position wherein said moving means is moveable along said length of said support means.

In a further aspect of the present invention there is provided a container for use in the rear compartment of a truck, said rear compartment having a pair of spaced apart side walls, said container comprising: a moving means adapted to register with a support means, said support means being mounted adjacent to the top of said pair of side walls, said support means having a length, said moving means being adapted to register with said support means and permit movement of said container along said length; and a securing means provided in combination with said support means for securing said container to said support means, said securing means being adapted to reciprocate between a first position wherein said container is secured, to a second position wherein said moving means is moveable along said length of said support means.

In still a further aspect of the present invention there is provided a method of retrofitting a container for use in the rear compartment of a truck with a securing system for securing said container between a pair of spaced apart side walls of said rear compartment, said container comprising a pair of side walls corresponding to said pair of side walls of said rear compartment, said securing system comprising means for securing said container to said rear compartment, said method comprising the steps of: installing a plurality of shafts on each of said pair of side walls of said container; installing a plurality of rotating means on each of said plurality of shafts so as to permit rotation of said rotating means about said plurality of shafts; installing a rail portion or protrusion on each of said pair of side walls of said rear compartment, each said rail having a profile that corresponds with a profile of said rotating means, so that each of said plurality of rotating means registers with the rail adjacent to each said rotating means; mounting said container between said side walls of said rear compartment on said rails so as to permit either rotating movement of said rotating means along said rail or securing engagement of said container to said rear compartment by said means for securing said container to said rear compartment.

An object of one aspect of the present invention is to provide a moveable truck container that can be moved along the length of the rear compartment on top of the side walls of a truck. A further object of the present invention is to provide a system for allowing truck containers such as toolboxes to be moved along the length of the rear compartment side walls of a truck and removed entirely from the truck for efficient use of the contents thereof.

Advantages of the present invention are:
(a) The system of the present invention provides for simple and cost effective means for permitting a container such as a toolbox to be easily moved along the rear compartment side walls of a truck.
(b) The container or toolbox of the present invention provides a particular construction which in association with a corresponding support means described herein allows the container or toolbox to be easily moved along the rear compartment side walls of a truck. The container or toolbox provided is relatively easy and inexpensive to manufacture.
(c) The compartment moving system and in particular the toolbox moving system described herein leaves more cargo space in the rear compartment of a truck than in the case of prior art systems, as in accordance with the present invention, cargo or other items can be stored in the rear compartment underneath the container or toolbox of the present invention.
(d) Because the system and container disclosed herein allows the container to be moved along the side walls of the rear compartment of a truck, and for said container or toolbox to be secured at various points along said length, said container or toolbox can be secured to a particular point along said length that is particularly useful as means for holding down cargo or other items stored in the rear compartment, or as means of a workbench provided by the top surface of the compartment.
(e) This system allows for other utilization of the system for household uses and recreational uses.
(f) This system allows for retrofitting existing containers such as toolboxes for better and more varied usage of the existing space within the pickup truck transport space.
(g) This system creates an efficient and inexpensive opportunity for the single vehicle family to enjoy the benefits of covered secure transport of their goods without the addition of an additional vehicle.
(h) This system also allows for the use of tie downs in the box of a pickup truck to eliminate the movement of goods in the pickup truck transport area; thus increasing safety and decreasing the opportunity for damage to the transported goods.

BRIEF DESCRIPTION OF THE DRAWINGS

A detailed description of the preferred embodiment(s) is(are) provided herein below by way of example only and with reference to the following drawings, in which.

Figure 1:
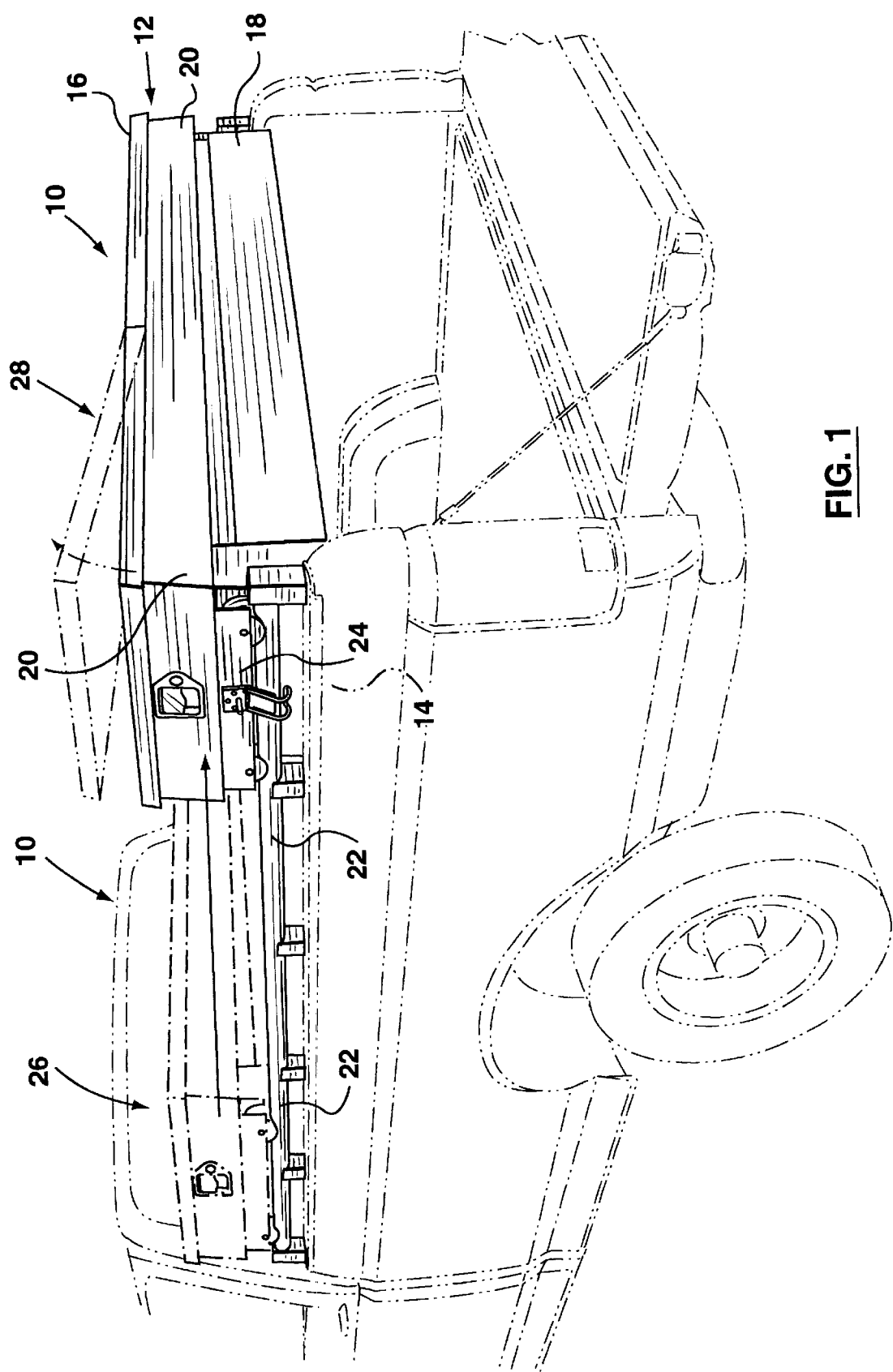
FIG. 1 is a partial perspective view of a pickup truck showing a first preferred embodiment of the truck toolbox moving system and first preferred embodiment of a moveable truck toolbox.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENTS

Figure 16:
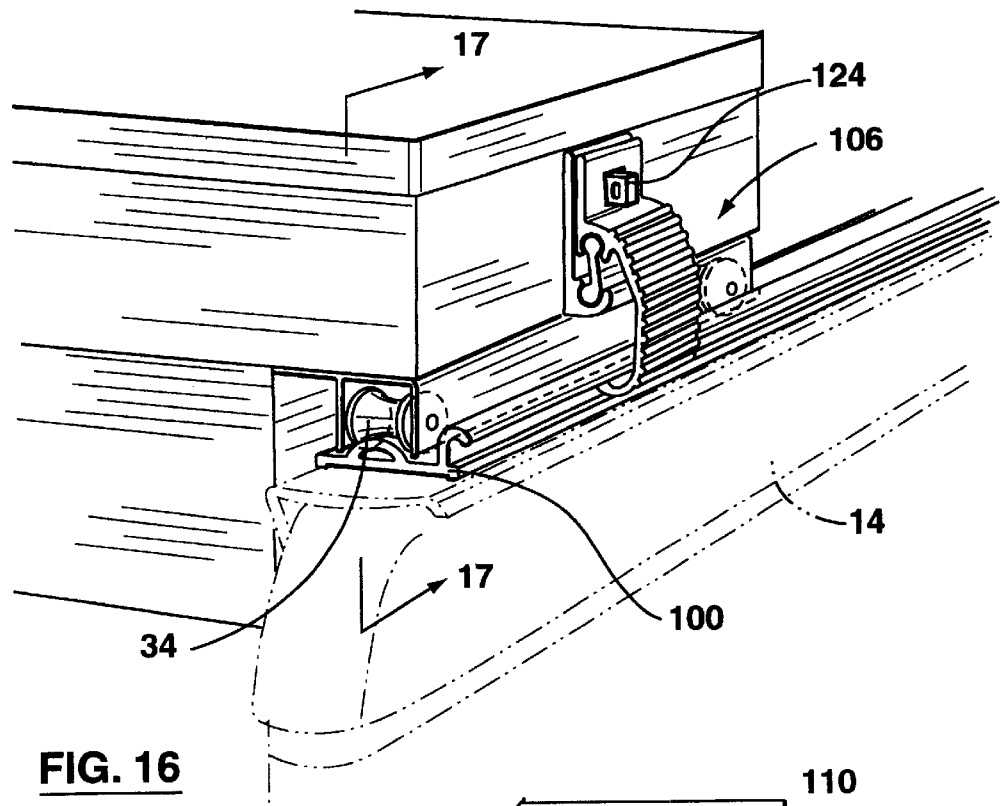
FIG. 16 is a partial perspective view of a first embodiment of the present invention.

The first preferred embodiment of the toolbox moving system of the present invention is illustrated in FIG. 16, mounted on the rear compartment 10 of a pickup truck. Toolbox 12 is a pickup toolbox of common construction that Is generally fastened to the floor of the bed of a pickup truck proximal to the passenger compartment. It should be understood, however, that the system described therein can be used in association with toolboxes of alternate constructions. Further, the moveable truck toolbox described herein can be provided with additional features and other constructions, without departing from the scope of the present invention. Still further toolbox 12 is intended to be representative of other similar compartments intended for use in association with the rear compartment of a pickup truck and also intended for use to store and/or transport bulky items such as camping gear, groceries and the like.

Figure 18:
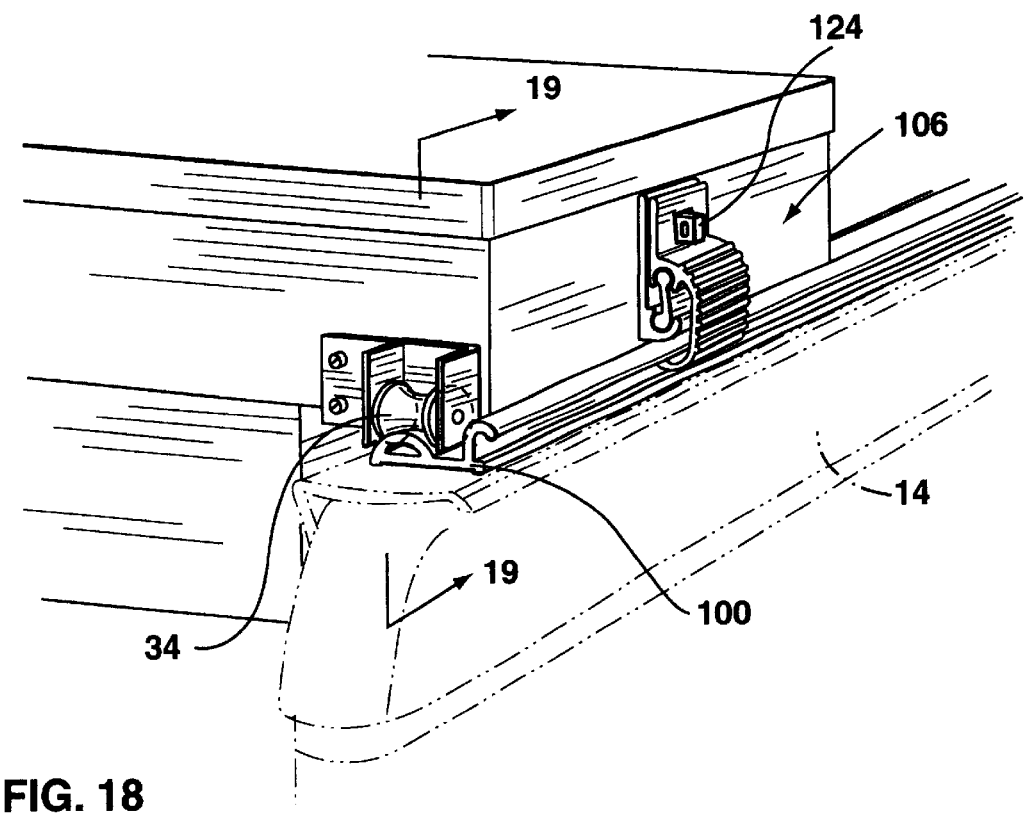
FIG. 18 is a partial perspective view of a second embodiment of the present invention.

As is the case in most pickup trucks, the rear compartment comprises a pair of side walls 14. As is illustrated in FIG. 16, said toolbox 12 comprises an upper portion 16 which extends laterally beyond the lower portion 18 of said toolbox 12 so as to define side extensions 20 of said upper portion 16. Said toolbox, as described herein, is adapted using the present invention to cooperate with supporting means 22 for supporting said side extensions 20, and thereby said toolbox 12 preferably rests on top of said side walls 14, as shown in FIGS. 16 and 18.

In addition, as further illustrated in FIG. 16, each of said side extensions 20 is provided with a moving means 24. Said supporting means 22 corresponds to said moving means 24, said supporting means 22 and moving means 24 thereby cooperating to move said toolbox 12 along the length of said supporting means 22. Said toolbox 12 can be moved manually using the system of the present invention from a first position proximate to the passenger compartment to a second position proximate to the back of the rear compartment 10. said toolbox 12 can still further be all together removed from said rear compartment 10. It should be understood, however, that electronic motors or hydraulic engines of various types can be combined with the system and movable toolbox of the present invention to provide displacement of said toolbox other than manually, without departing from the present invention.

The mounting means comprises a bogie 30, as best shown in FIG. 16. Said bogie 30 comprises a bracket portion 32 which is adapted to receive wheels 34 which are turnably mounted on said bracket portion 32 by means of axles 36.

Figure 2:
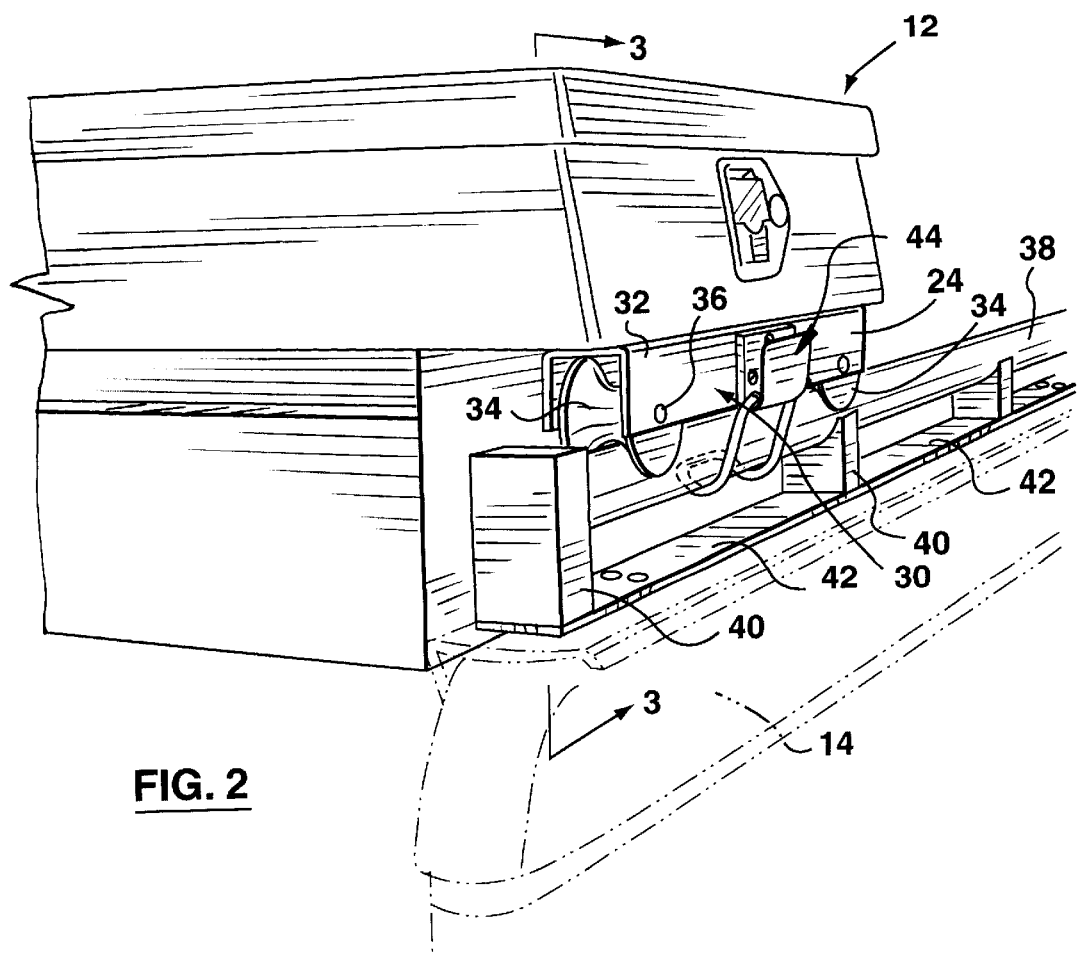
FIG. 2 is a partial perspective view of the first preferred embodiment of a first preferred embodiment of the truck toolbox moving system and first preferred embodiment of a moveable truck toolbox.
Figure 3:
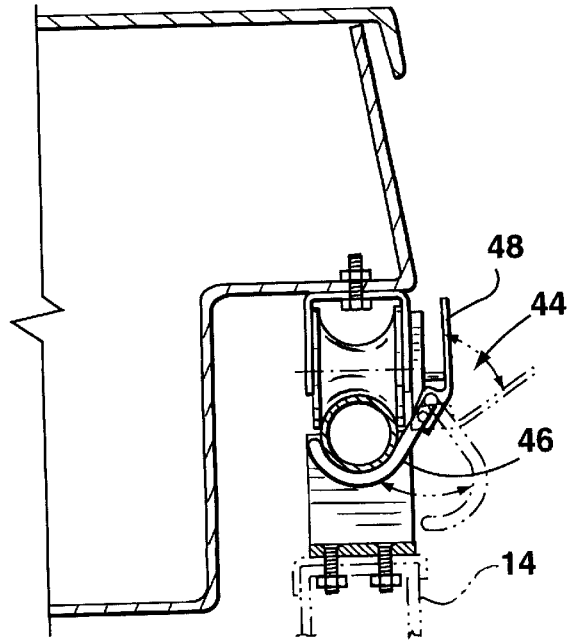
FIGS. 3 is a partial cross-sectional of the first preferred embodiment of the truck toolbox moving system and first preferred embodiment of the moveable truck toolbox disclosed herein, along the line 3—3 shown in FIG. 2.

Also as seen in FIG. 2, said supporting means 22 of the first preferred embodiment of the present invention comprises a rail 38 which is connected to said side walls 14 by means of rail supports 40 and support base 42. As best seen in FIG. 3, said wheels 34 have a concave profile that corresponds with the substantially circular profile of said rail 38. This first preferred embodiment is advantageous as the circular profile of rail 38 discourages build-up of snow, dirt or the like which might impede the functioning of the system provided herein. Also, said concave profile of wheel 34 allows said toolbox 12 to be moved along said rails 38, while tending to maintain said toolbox 12 in place on said rails 38 thereby reducing the likelihood of said toolbox 12 being unintentionally "derailed".

Said support base 42 is fastened by means of nuts and bolts or the like to the top of said side walls 14, in a manner well-known to those skilled in the art. Alternatively, said supporting means 22 can be provided by a rail support 40 which is fastened to said side walls 14. As a further alternative, said rail supports 40 and support base 42 can be provided by a single structural element. In each embodiment provided herein, preferably said supporting means 22 has structural integrity that is relatively significant, given the significant weight of toolbox 12, especially when filled with tools. In the particular embodiment of the invention illustrated in FIGS. 1 and 2 therefore, a sufficient number of rail supports 40 are employed. Said rail 38, rail supports 40 and support base 42 may comprise a number of materials. Rail 38 may comprise steel, brass or some other material with significant structural integrity, and preferably having anticorrosive qualities as well. Rail supports 40 can comprise, for example, ultra high-density polyethylene.

While the toolboxes of the construction shown in the drawings are relatively heavy, and therefore it is unlikely that such toolboxes will be "derailed" from the toolbox moving system described herein, for example, during transport, means for securing the toolbox to said toolbox moving system is desirable. This is provided by securing means 44, shown in FIGS. 2 and 3. Securing means 44 comprises a standard multi-lever combined with a J-clamp 46 as best shown in FIG. 3. This permits the toolbox 12 to be secured to rail 38 when J-clamp 46 is positioned under rail 38 and multi-lever 48 is manually engaged upward, also as shown in FIG. 3. When said multi-lever 48 is so engaged, J-clamp frictionally engages rail 38 so as to hold said toolbox in place, in a manner well-known to those skilled in the art.

Another advantage of the present invention is that using the moving system described herein, toolbox 12 can be secured at any point along rails 38. One of the benefits of this feature is that toolbox 12 can be positioned so as to best hold down cargo or other items stored in the rear compartment of the truck. In addition, as toolbox 12 in the present invention is in an elevated position as compared to prior art system and toolboxes in which the toolbox is substantially at the level of the floor of the rear compartment of a truck, the top surface of said toolbox can be used as a workbench.

It should be understood, however, that other means of securing mounting means 24 and thereby the toolbox to support means 24 other than the J-clamp and multilever illustrated in FIGS. 2 and 3 are also fall within the scope of the present invention. It is also desirable to provide said toolbox with means for locking said toolbox to the moving system provided for herein. This is easily achieved, for example, by providing said toolbox with a lock which is associated with, for example, said multi-lever 48 for locking said toolbox to the moving system. The lock can be any type of lock, including combination and/or keyed locks.

Figure 4:
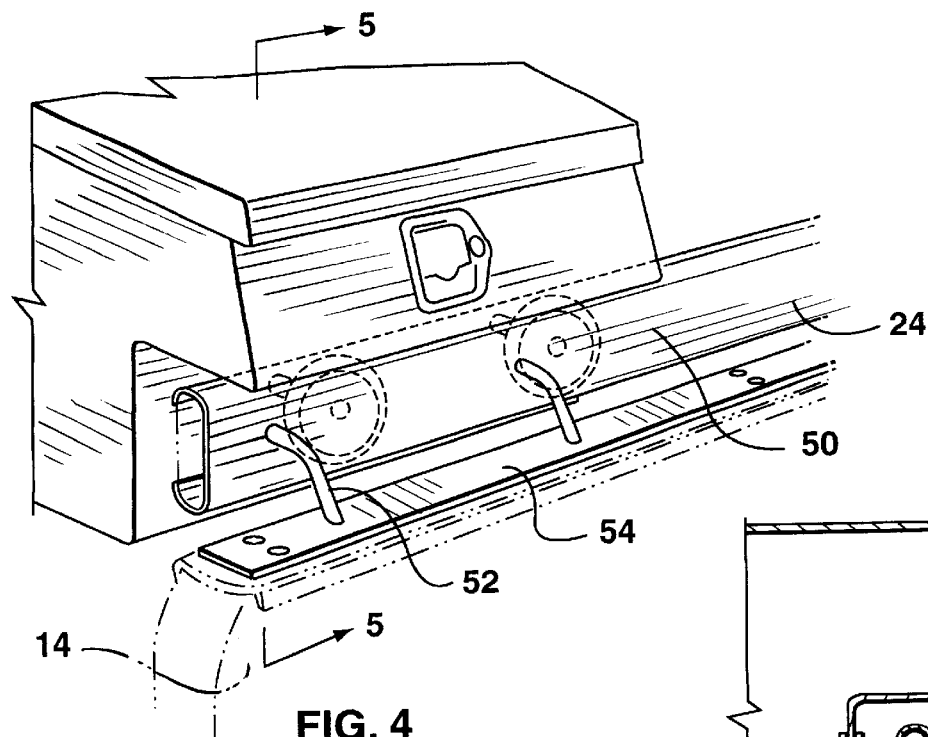
FIG. 4 is a partial perspective view of a second preferred embodiment of the truck toolbox moving system and second preferred embodiment of the moveable truck toolbox disclosed herein.
Figure 5:
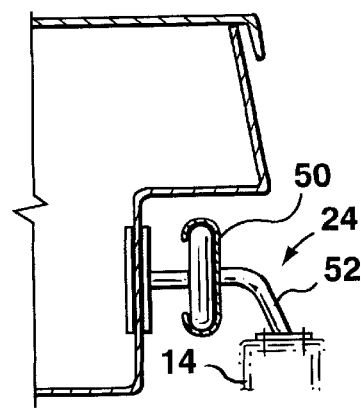
FIG. 5 is a partial cross-sectional of the second preferred embodiment of the truck toolbox moving system and second preferred embodiment of the moveable truck toolbox disclosed herein, along the line 5—5 shown in FIG. 4.

FIGS. 4 and 5 show a second preferred embodiment of the system described herein. In this second embodiment, said support means 22 comprises a C-channel 50 which is connected to side wall 14 by means of a plurality of extension arms 52, which extension arms are then connected to side wall 14, for example, by intermediary of base element 54 which is fastened to said side wall 14 by using nuts and bolts or the like.

In this second preferred embodiment of the present invention, the side wall of said lower portion 18 of said toolbox presents a series of wheels 56 which rotate inside C-channel 50 thereby permitting said toolbox to be moved along said C-channel 50, as described above.

Figure 6:
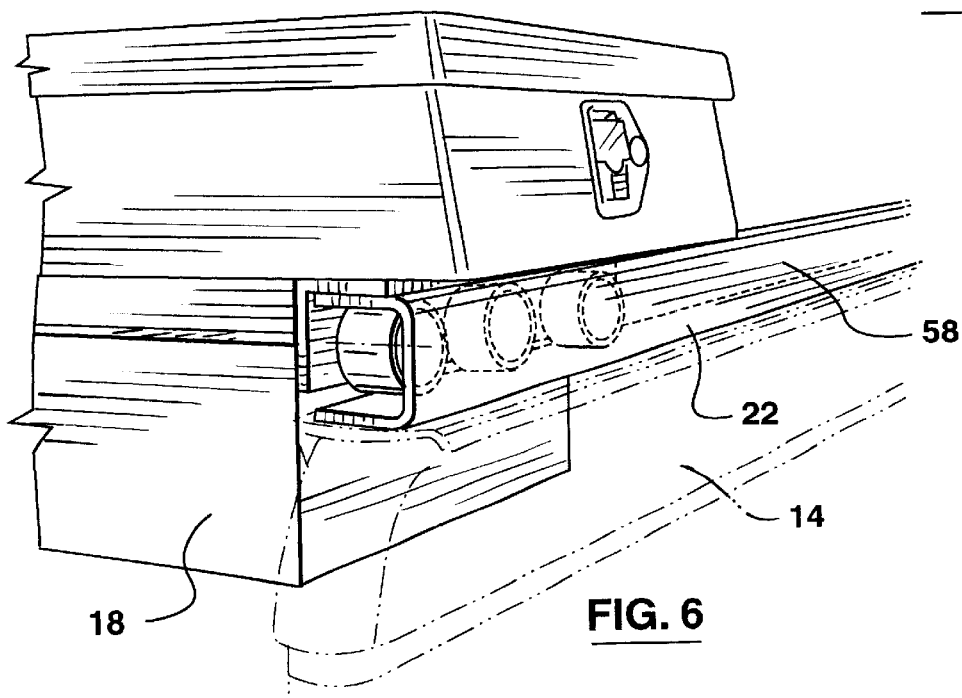
FIG. 6 is a partial perspective view of a third preferred embodiment of the truck toolbox moving system and third preferred embodiment of the moveable truck toolbox disclosed herein.

In a third preferred embodiment of the present invention, illustrated in FIG. 6, said support means 22 comprises a U-shaped channel 58 and said lower portion 18 provides a series of wheels which adapted to move within said U-channel 58, again as described above.

It should be understood from the above, that each embodiment of the moving system can be used in association with a standard truck toolbox. In each such case, the particular embodiment of the mounting means 24 is secured to the toolbox, in a manner that is well-known, for example, by drilling holes in the toolbox and securing the particular mounting means 24 of the embodiment of the system described herein in question using nuts, bolts, reinforcing brackets and the like.

Figure 7:
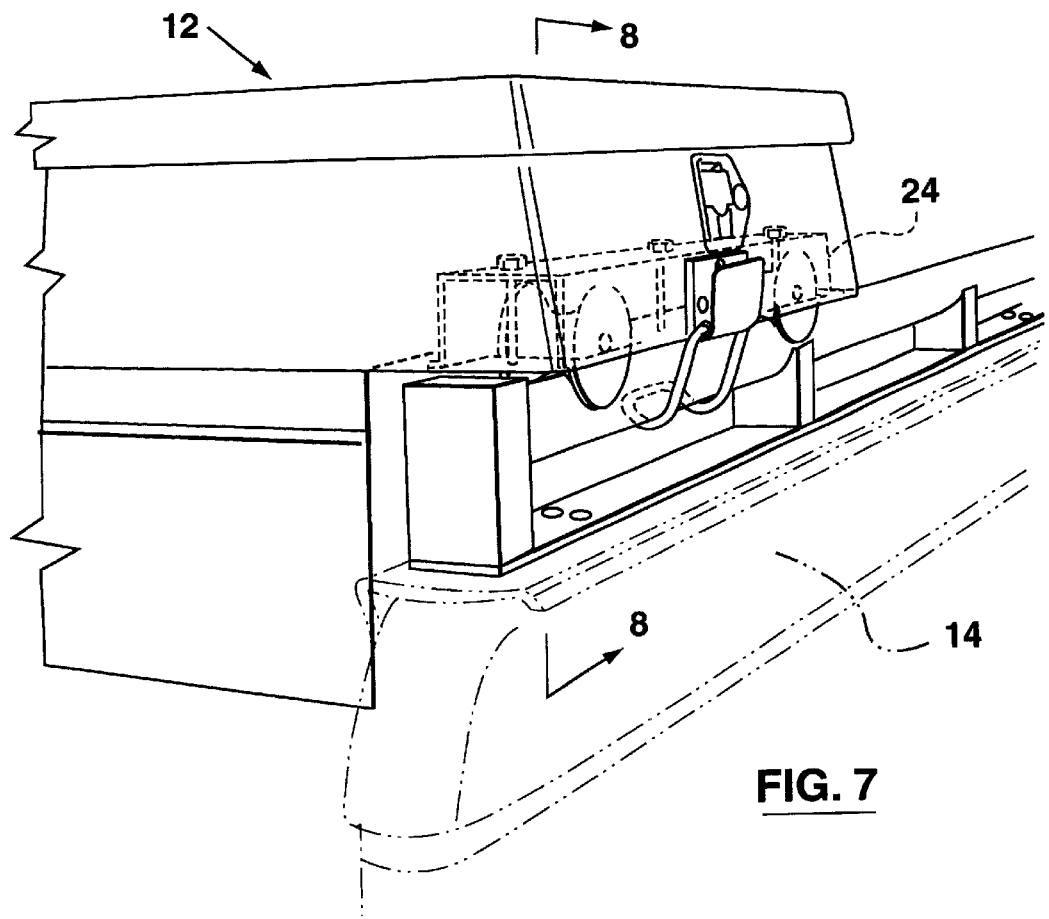
FIG. 7 is a partial perspective and broken away view of the fourth preferred embodiment of the truck toolbox moving system and fourth preferred embodiment of the moveable truck toolbox disclosed herein.
Figure 8:
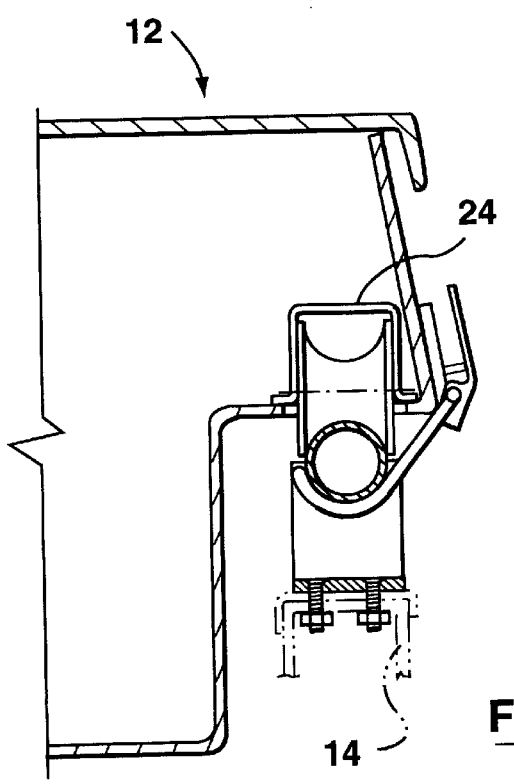
FIG. 8 is a partial cross-sectional view of the fourth preferred embodiment of the truck toolbox moving system and fourth preferred embodiment of the moveable truck toolbox disclosed herein along the line 8—8 shown in FIG. 7.

As best shown in FIGS. 7 and 8, said mounting means 24 of each of said first, second, third and fourth embodiment discussed above, can also be provided as part of said toolbox.

Figure 9:
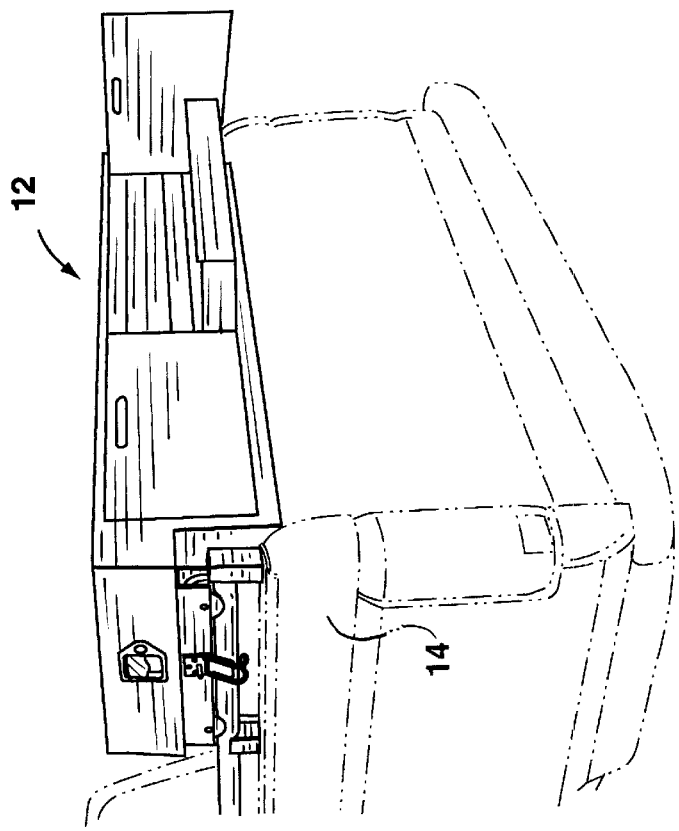
FIGS. 9 and 10 illustrate further features of the moveable truck toolbox described herein.
Figure 10:
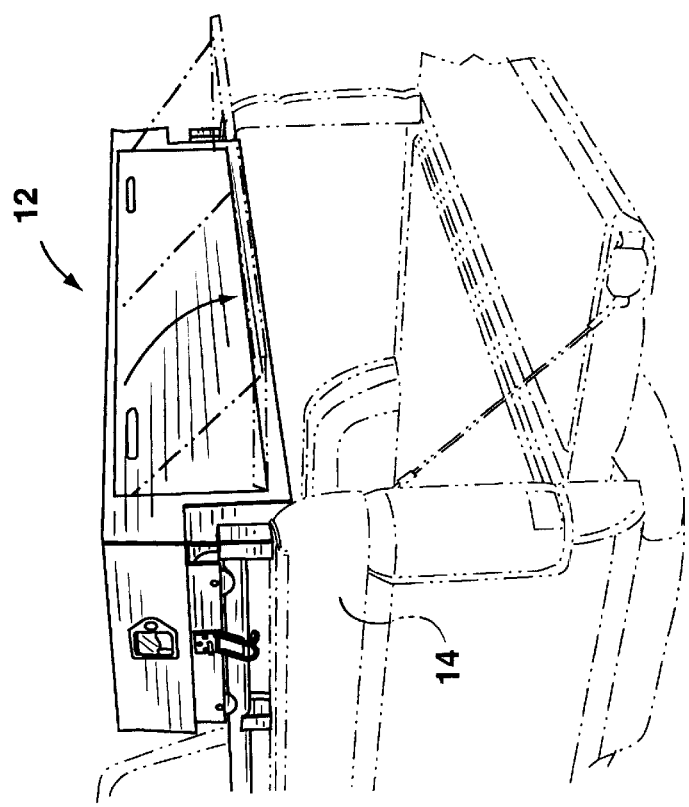

Again, as previously described, by means of the system and moveable toolbox described herein, said toolbox can be moved to the back of the rear compartment as best shown in FIGS. 9 and 10. This is particularly useful as at a work site access to the tools may be required, but such tools are actually used off of the truck at the work site itself. As best shown in FIGS. 9 and 10, the present invention provides for means to gain ready access to the tools contained in toolbox 12 without having to climb into the rear compartment of the truck each time a tool is required. Nor is it necessary to lift the toolbox at all to achieve these benefits. In view of the significant weight of such toolboxes, especially when filled with tools, and the concomitant risk of injury when lifting the toolbox, this is particularly an important benefit.

Figure 17:
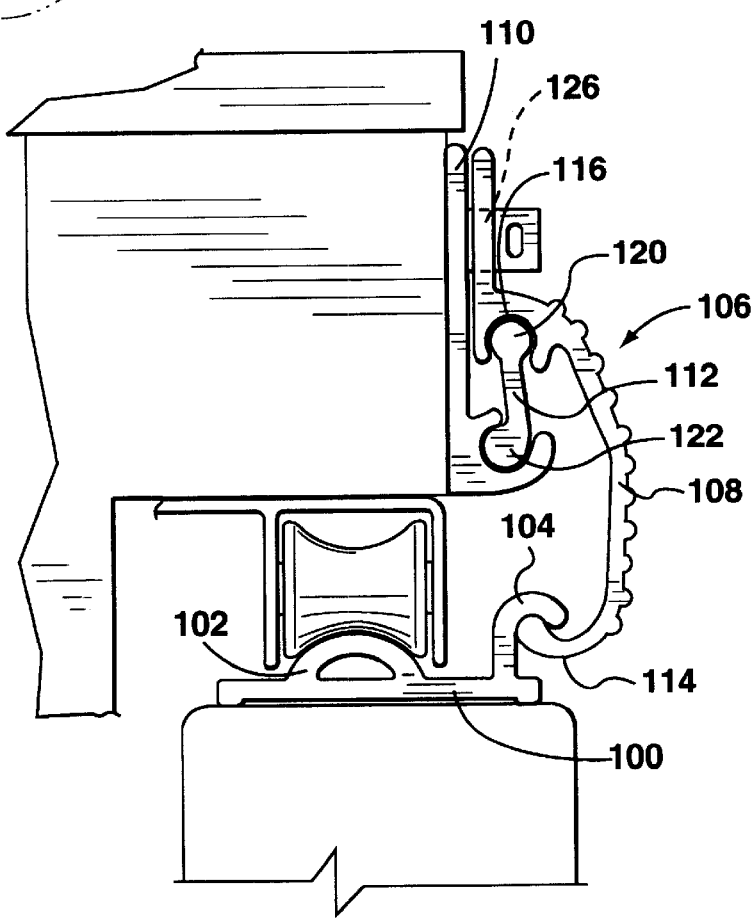
FIG. 17 is a cross-sectional view of the first embodiment of the present invention.

FIGS. 16 and 17 illustrate a first preferred embodiment of the present invention, In this fifth embodiment, the supporting means 22 of the present invention is presented by another embodiment of a rail, namely a rounded rail 100 that is fixed to side walls 14, for example, by means of fasteners such as nuts and bolts or screws, in a manner that is known. The rounded rail 100 presents means for secure attachment to a latch assembly 106 that is mounted to toolbox 12, in the manner described below. Rounded rail 100 comprises a round portion or protrusion 102 that corresponds substantially in shape to the profile of wheels 34, thereby tending to maintain the toolbox 12 in place on rounded rail 100. Rounded rail 100 further comprises a hook 104.

Latch assembly comprises a brace 108, anchor plate 110 and connecting member 112. Connecting member 112 comprises a first end 120 and second end 122. Brace 108 comprises a brace hook 114 adapted to register with hook 104. Brace 108 further comprises a socket means 116 for registering with said first end 120 of connecting member 112. Said anchor plate 110 is mounted on toolbox 12, by means of, for example, a fastener such as nuts and bolts or the like. Anchor plate 112 comprises a socket mean 118 that is adapted to register with second end 122 of connecting member 112.

The various elements of latch assembly 106 comprise a resilient material such as plastic or aluminum, provided in a manner that is well known, for example by means of heat extrusion. The elements of latch assembly 106 thereby permits the anchor plate 110 and rounded rail 100 to be connected by snapping brace 108 into hook 104 and first end 120 of connecting manner 120.

Anchor plate 110 can be further provided with a security lock hasp 124 that is adapted to pass through a passageway 126 disposed in brace 108, as best shown in FIG. 17. A lock (not shown) is used in association with passageway 126 to lock said brace 108 in place, whereby brace 108 cannot be lifted out of its registering position with connecting member 112, whereby said toolbox 12 is locked to said rounded rail 100

Figure 19:
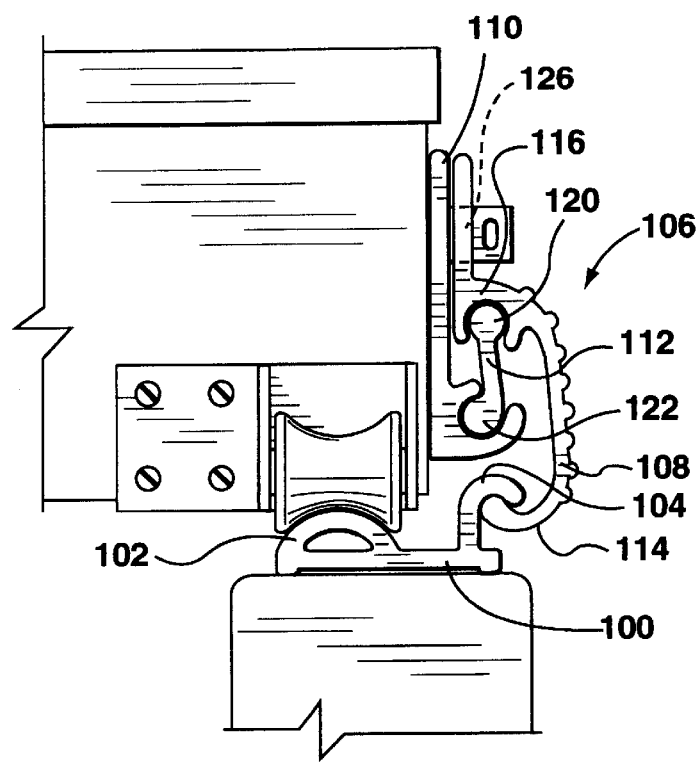
FIG. 19 is a cross-sectional view of the second embodiment of the present invention.

As shown in FIGS. 16 and 17 said wheels 34 are either mounted on said toolbox 12 by means of a brace 121 to the side wall of said tool box 12 or the back wall of said toolbox 12, as shown in FIGS. 18 and 19.

Figure 11B:
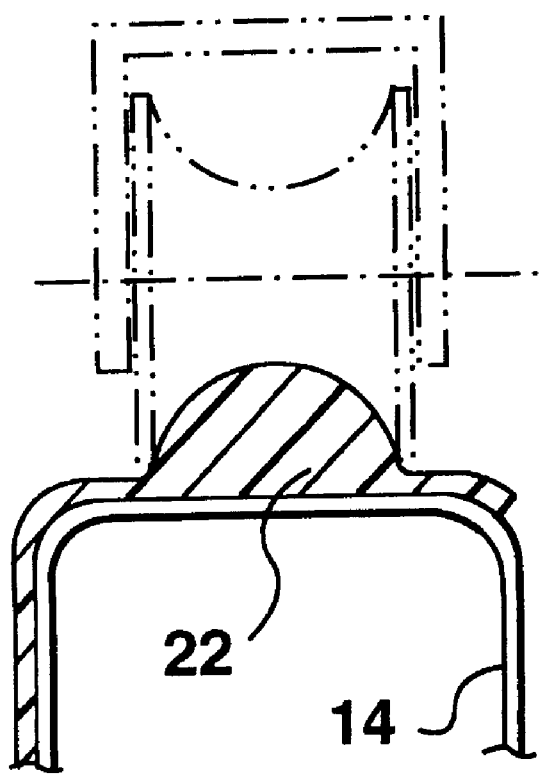
FIG. 11b shows an alternate embodiments of the truck toolbox moving system provided for herein wherein the support means of the present invention Is molded into the side walls of a truck.

Other variations and modifications of the invention are possible. For example, side walls 14 of a truck can already be provided with support means 22 described herein of each particular embodiment of the system and moveable toolbox described herein and as illustrated in FIG. 11b. Said FIG. 11b, illustrate a variation of the present invention wherein said support means 24 is presented by the truck box liner or rails molded of plastic and secured to the upper portion of side walls 14. It should also be understood that a further benefit of the present invention is that the moving system described herein can accommodate more than one toolbox. If more than one construction worker is travelling to a work site, transportation of more than one toolbox may be required as workers tend to use their own tools. It should be further understood that toolboxes of various types, shapes and sizes can be accommodated by the moving system disclosed herein, also such alternate toolboxes can be provided with the moving means described herein. For example, lighter boxes for conveyance of parts and/or construction materials might be used. Such lighter materials might include plastic, fiberglass, wood etc. Also, given the popularity of pick up trucks, boxes for carrying material other than tools are also contemplated by the present invention For example, other boxes may be associated with the moving system described herein such as boxes for carrying sports equipment, camping equipment or groceries, or also, coolers. All such modifications or variations are believed to be within the sphere and scope of the invention as defined by the claims appended hereto.

I claim:

1. A securing system for securing a container to the rear compartment of a truck, the rear compartment comprising a pair of spaced apart side walls, the securing system comprising:

(a) a support means mounted adjacent to the top of said pair of side walls, said support means including a protrusion (102) having a length and a profile and being adapted to support said container between said pair of side walls;

(b) a moving means connected to said container, wherein said moving means is adapted to register with said protrusion (102) and permit movement of said moving means along said length of said support means; and (c) a securing means for securing said container to said support means, said securing means being adapted to reciprocate between a first position wherein which said container is secured with respect to said rear compartment, and a second position in which said container is moveable along said length of said support means and is further removeable in said second position from said support means.

2. A securing system as claimed in claim 1, wherein said securing means includes:

(a) a retaining portion of said protrusion (102);

(b) a clamp means including an engaging portion that engages said retaining portion such that said clamp means is engageable to permit said container to be secured to said support means at a plurality of points along said length of said support means.

3. A securing system as claimed in claim 2, wherein said support means includes comprises an extruded partial rail means mounted on each of said pair of side walls, said partial rail means having a profile that is adapted to register with a corresponding profile of said plurality of wheels, thereby discouraging said plurality of wheels from derailing from said rail.

4. A securing system as claimed in claim 3, wherein said profile of said rail is convex, and said corresponding profile of said plurality of wheels is concave.

5. The securing system as claimed in claim 1 or 2, wherein the container includes a front wall and back wall, and wherein said moving means includes: a frame means securable to each of said front wall and back wall, said frame means retaining a shaft and a wheel mounted on said shaft for rotating movement about said shaft.

6. A method of retrofitting a container for use in the rear compartment of a truck with a securing system for securing said container between a pair of spaced apart side walls of said rear compartment, said container comprising a pair of side walls corresponding to said pair of side walls of said rear compartment, said securing system comprising means for securing said container to said rear compartment, said method comprising the steps of:

(a) installing a plurality of shafts on each of said pair of side walls of said container;

(b) installing a plurality of rotating means on each of said plurality of shafts so as to permit rotation of said rotating means about said plurality of shafts;

(c) installing a support means including a protrusion (102) on each of said pair of side walls of said rear compartment, each said protrusion (102) having a profile that corresponds with a profile of said rotating means, so that each of said plurality of rotating means registers with the protrusion (102) adjacent to each said rotating means;

(d) mounting said container between said side walls of said rear compartment on each said protrusion so as to permit either rotating movement of said rotating means along each said protrusion (102) or securing engagement of said container to said rear compartment by said means for securing said container to said rear compartment.

* * * * *